Aug. 12, 1924.

S. H. COWIN

BEARING

Filed Jan. 16, 1919

1,504,608

WITNESSES:
J. A. Helsel.
F. A. Lind.

INVENTOR
Stuart H. Cowin.
BY
Wesley G. Carr
ATTORNEY

Patented Aug. 12, 1924.

1,504,608

UNITED STATES PATENT OFFICE.

STUART H. COWIN, OF EDGEWOOD PARK, PENNSYLVANIA, ASSIGNOR TO WESTINGHOUSE ELECTRIC & MANUFACTURING COMPANY, A CORPORATION OF PENNSYLVANIA.

BEARING.

Application filed January 16, 1919. Serial No. 271,448.

*To all whom it may concern:*

Be it known that I, STUART H. COWIN, a citizen of the United States, and a resident of Edgewood Park, in the county of Allegheny and State of Pennsylvania, have invented a new and useful Improvement in Bearings, of which the following is a specification.

My invention relates to bearings and it has particular relation to bearings employed in machines consisting of several alined units such, for example, as motor-generator sets.

The object of my invention is to provide a device of the character indicated whereby the number of stationary bearings required may be reduced and whereby machines slightly out of alinement with each other may be coupled together by means of a rugged, simple and inexpensive device.

Figure 1:
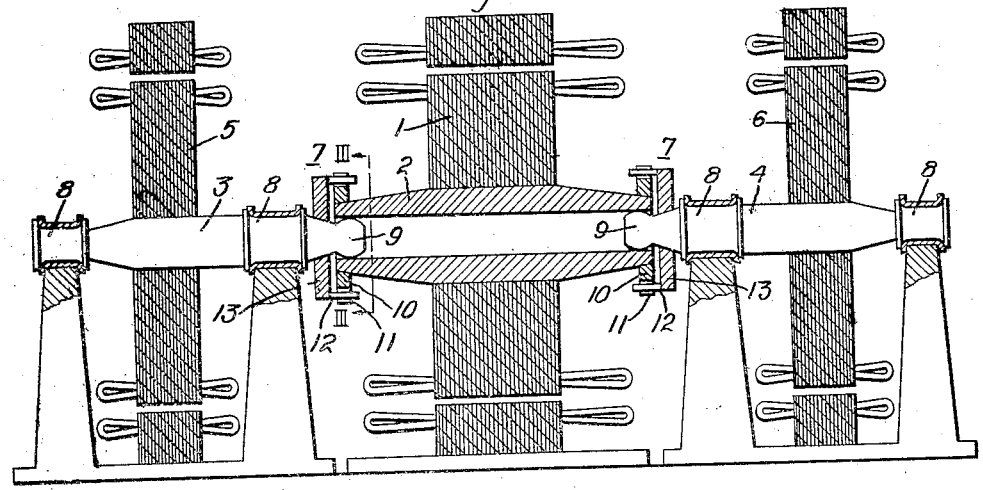
Figure 2:
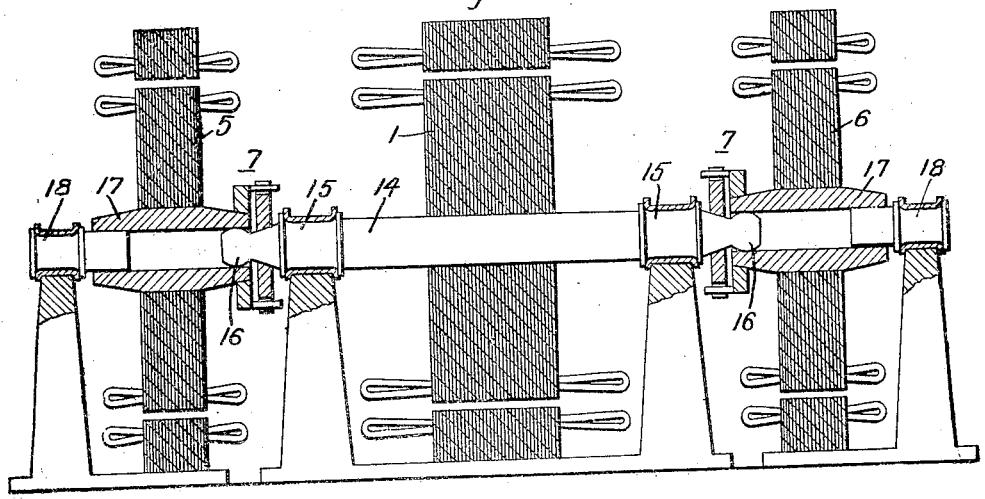
Figure 3:
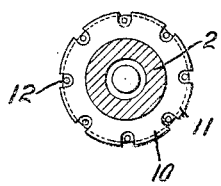

In the accompanying drawings, Fig. 1 is a sectional view of a motor-generator set comprising a motor and two generators constructed in accordance with my invention; Fig. 2 is a similar view of a modification thereof, and Fig. 3 is a sectional view along the line III—III of Fig. 1, showing the coupling device.

Heretofore, it has been customary, in assembling a machine consisting of a plurality of independent units, to provide each of these units with bearings at each end thereof, carefully alining the shafts of the units and connecting them together by a clutch member, usually of the rigid type.

While this type of construction is satisfactory from a mechanical point of view, it is necessarily more expensive and more cumbersome than a machine provided with devices constructed in accordance with my invention wherein the number of these stationary bearings is reduced and a more compact structure is substituted therefor.

By my invention, I provide a bearing of a novel type which I shall hereinafter refer to as a rotatable bearing and which enables me to mount a shaft on a projecting end of an adjacent shaft. In other words, my invention consists of a universal joint which is adapted to transmit not only torque but also lateral stresses.

For a further understanding of my invention, reference may be had to the drawings in which I have shown a motor rotor 1 mounted upon a shaft 2 which, in turn, is connected to, and mounted on, shafts 3 and 4 of generators 5 and 6, respectively, by means of rotatable bearings 7. Each of the generators 5 and 6 is provided with a stationary bearing 8 at each end thereof. The shaft 2 of the motor 1 is hollow, and the ends thereof are adapted to receive approximately spherical portions 9 of the shafts 3 and 4 which extend through the bearings 8 adjacent the motor. The hollow shaft 2 is provided with annular members 10 at its ends that are provided with fingers 11 which coact with fingers 12 of similar annular members 13 that are mounted on the shafts 3 and 4. Torque is transmitted from the shaft 2 to the shafts 3 and 4 by means of the annular member 10, the coacting fingers 11 and 12 and the annular member 13. The weight of the motor rotor 1 is borne by the projecting ends 9 of the shafts 3 and 4.

From this description, it will be obvious that the machine may be somewhat out of alinement without affecting the operation thereof and that two stationary bearings, which normally would support the rotor 1, have been eliminated, being replaced by the rotatable bearings 7 which also are universal joints adapted to withstand lateral stresses. While the shafts 2, 3 and 4 are connected together so as to rotate at the same speed, if they should be slightly out of alinement, the hollow shaft 2 would adjust itself upon the spherical members 9, the bearing surfaces of which provide for this contingency.

Referring to Fig. 2, the motor rotor 1 is provided with a solid shaft 14 having two stationary bearings 15 and projecting ends 16, approximately spherical shape, that project beyond the bearings. Each of the generator rotors 5 and 6 is provided with a hollow shaft or quill 17 which is mounted upon the adjacent end 16 of the shaft 14 by means of rotatable bearings 7, as previously described, and is provided with a stationary bearing 18 at its other end.

Here again, it will be obvious that I have dispensed with two stationary bearings which ordinarily would have been provided on the sides of the generator adjacent the motor and have substituted therefor rotatable bearings arranged in accordance with my invention which are simpler and less expensive to construct and which allow the machines to be built more compactly.

While I have shown my invention as applied to dynamo-electric machines, it will, of course, be obvious that it is not limited to such machines but may be employed in any machine where it is desired to connect together two substantially alined shafts.

While I have shown only two forms of my invention, it is not so limited but is susceptible of various minor changes and modifications without departing from the spirit thereof, and I desire, therefore, that only such limitations shall be placed thereupon as are imposed by the prior art or are specifically set forth in the appended claims.

I claim as my invention:

1. In combination with two abutting, approximately alined shafts, an energy-translating machine mounted upon each of said shafts, a universal joint capable of supporting the weight of one of said shafts joining the abutting ends, and a supporting bearing on only one side of said joint for providing the sole shaft supporting means at the abutting ends of both machines.

2. In combination, two separate machines provided with rotatable shafts disposed in substantially end-to-end relation, one of said shafts being provided with a stationary bearing at each end thereof and one end of the other shaft being mounted on and solely supported by said first mentioned shaft by means of a universal joint comprising a recess in the end of one of said shafts and a portion of the other shaft adapted to fit therein, and means for transmitting torque therebetween.

3. The combination with a machine having a bearing and a shaft extending through said bearing at that end, of a second machine having no bearing of its own at one end, and a universal coupling capable of bearing lateral stresses whereby said end of said second shaft is supported from the projecting end of said first shaft.

4. In combination, a pair of separate machines provided with substantially aligned shafts, one of said machines being provided with a stationary bearing, the end of the shaft of said machine extending through said bearing, the end of the shaft of the other machine being provided with means adapted to engage and be solely supported on the end of the first named shaft to effect a universal joint therebetween.

5. In combination, a plurality of dynamo-electric machines disposed in end-to-end relation, the shaft of one of said machines being provided with bearings and the shaft of the other of said machines being supported at one end solely on the shaft of the first mentioned machine.

6. The combination of three separate dynamo-electric machines mounted in end-to-end relationship with their shafts in approximate alinement, the central machine having no supporting bearings of its own, and universal joints capable of bearing lateral stresses joining the shafts of said machines whereby the shaft of said central machine is supported solely by the shafts of the two end machines.

7. The combination of three separate energy-translating machines mounted in end-to-end relationship with their shafts in approximate alinement, the central machine having no supporting bearings of its own, and universal joints capable of bearing lateral stresses joining the shafts of said machines whereby the shaft of said central machine is supported solely by the shafts of the two end machines.

In testimony whereof, I have hereunto subscribed my name this 27th day of Dec. 1918.

STUART H. COWIN.